Nov. 23, 1948.   C. E. FUNK, JR   2,454,644
PURIFICATION OF GUANIDINE NITRATE
Filed Oct. 13, 1942
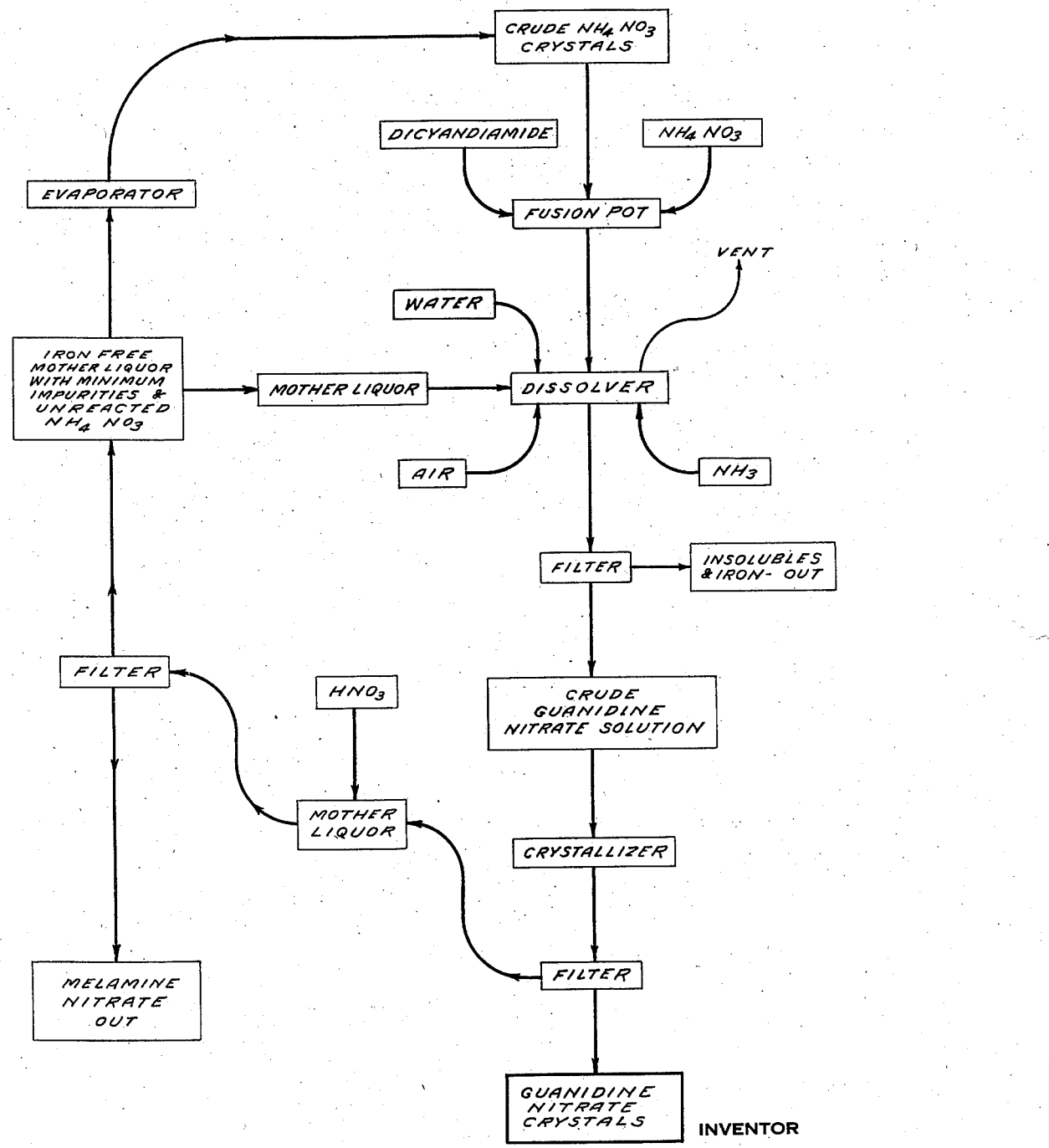
INVENTOR
CHARLES E. FUNK, JR.,
BY
ATTORNEY Patented Nov. 23, 1948

2,454,644

UNITED STATES PATENT OFFICE 2,454,644

PURIFICATION OF GUANIDINE NITRATE

Charles E. Funk, Jr., Cos Cob, Conn., assignor to American Cyanamid Company, New York, N. Y., a corporation of Maine Application October 13, 1942, Serial No. 461,849

1 Claim. (Cl. 260—564)

The present invention relates to a method of preparing guanidine nitrate and is particularly concerned with a method for removing most, if not all, iron and melamine from the crude product.

The invention is further concerned with the recovery of unreacted portions of ammonium nitrate so as to increase the overall yields and eliminate wastes.

The invention is further concerned with a cyclic process wherein not only is a good rate of guanidine nitrate obtained but values from mother liquors are utilized and returned to the cycle.

One commercial method of producing guanidine nitrate is to fuse ammonium nitrate with dicyandiamide hereinafter referred to as "dicy." As the guanidine nitrate forming reaction is exothermic, appreciable quantities of melamine result as a by-product. This material is an undesirable impurity in guanidine nitrate for many uses.

Again, the reaction appears to proceed more advantageously when ammonium nitrate is used in excess of that required to completely react with all of the dicy. As a consequence, unreacted ammonium nitrate remains in the fusion product.

Inasmuch as it is customary to carry out the process in iron or iron-containing vessels, there is a tendency for the reactants or reaction product to become unduly contaminated with iron.

The accompanying drawing illustrates a flow sheet of the process.

It is the principal object of the present invention to remedy the above deficiencies so as to carry out the complete process in an efficient manner with high recoveries of a pure product.

The invention contemplates removal of iron from the dissolved crude melt by use of NH₃ or the like, other insolubles of this type being discarded along with the precipitated iron by filtering.

The present invention is further based upon the discovery that the melamine impurity may be converted to a substantially insoluble form by adjusting the pH to 3.6 or below. The use of nitric acid in this pH adjustment is particularly desirable inasmuch as where ammonia is used as the iron precipitating agent, ammonium nitrate is thus formed, a valuable reactant in the process which may be substantially recovered and returned to the cycle.

The invention further includes recovery of valuable guanidine nitrate and ammonium nitrate from such mother liquors by suitable treatment, and the establishment of a cyclic process.

To this end the invention contemplates drowning the fusion product in water or mother liquor from a previous cycle. At this stage air may be bubbled through the solution to convert ferrous iron to the ferric state, and an alkali, preferably ammonia, added until the pH is on the alkaline side whereupon the iron is thrown out as hydroxide. Upon filtering, the precipitated iron along with other insolubles may be removed. The crude guanidine nitrate solution may then be crystallized by lowering the temperature and/or removing water to obtain a substantially pure product containing less than 5 parts per million of iron and 0.4% melamine, provided the mother liquor used in whole or in part to dissolve the crude melt has been purified as hereinafter described.

The crystallization mother liquor may be purified and its melamine content removed by treating with nitric acid until the pH of the solution is 3.6 or below. At this point, the melamine content is converted to melamine nitrate which is substantially insoluble at the existing pH. It is consequently precipitated and may be removed. When ammonia has been used as the iron precipitating agent, additional quantities of ammonium nitrate will be formed during the nitric acid additions.

This newly formed ammonium nitrate plus initial and unreacted quantities occuring therein may be returned to the cycle in solution form in whole or in part to dissolve the crude fusion product or, if desired, may be evaporated to dryness to produce a crude solid ammonium nitrate. This material may then be added direct to the fusion pot.

While the invention has been described with reference to a specific embodiment, it is not to be limited thereto but is to be construed broadly and restricted only by the scope of the claim.

What is claimed is:

In a method of fusing ammonium nitrate and dicyandiamide, dissolving the melt in water, aerating the solution to convert ferrous iron to ferric iron, precipitating the iron with ammonia, removing the insoluble impurities, and recrystallizing guanidine nitrate from the substantially iron free solution separating out the nitro guanidine crystals from the mother liquor, the improvement in purifying the thus produced mother liquor from the guanidine nitrate crystallization which includes adjusting the pH thereof to 3.6 or below with nitric acid and removing the precipitated impurities and recycling the thus purified mother liquor containing ammonium nitrate to a point in the process to dissolve the said melt.

CHARLES E. FUNK, Jr.

REFERENCES CITED

The following references are of record in the file of this patent:

UNITED STATES PATENTS

| Number | Name | Date |
|---|---|---|
| 2,221,478 | Hill et al. | Nov. 12, 1940 |
| 2,252,400 | Hill et al. | Aug. 12, 1941 |
| 2,258,612 | Jayne, Jr., et al. | Oct. 14, 1941 |

OTHER REFERENCES

Chem. Abstracts, vol. 22, page 226.

Treadwell-Hall, "Analytical Chemistry," vol. II, 7th edition, John Wiley & Sons, 1930, page 87.

Curtman, "Qualitative Chemical Analysis," MacMillan Co., New York, 1932, pages 205 and 206.